United States Patent [19]

Grove

[11] 4,037,680
[45] July 26, 1977

[54] APPARATUS FOR ADJUSTING CAMBER

[76] Inventor: Clinton E. Grove, 23-1st St. SE., Box 2013, Elbow Lake, Minn. 56531

[21] Appl. No.: 570,657

[22] Filed: Apr. 23, 1975

[51] Int. Cl.² .............................................. B60K 17/30
[52] U.S. Cl. .................................. 180/43 R; 280/661
[58] Field of Search ....................... 301/125, 131, 132; 180/44 R, 43 R; 280/96.2 B, 661

[56] References Cited

U.S. PATENT DOCUMENTS

| 774,042 | 11/1904 | Cooper | 301/132 |
|---|---|---|---|
| 2,405,889 | 8/1946 | Kennedy | 308/151 |
| 2,772,596 | 12/1956 | Trussell | 280/96.2 B |
| 2,978,253 | 4/1961 | Weiss et al. | 280/96.2 B |
| 3,472,331 | 10/1969 | Baker et al. | 180/43 R |

FOREIGN PATENT DOCUMENTS

| 1,081,776 | 6/1956 | Germany | |
|---|---|---|---|
| 646,067 | 11/1950 | United Kingdom | 180/43 A |
| 494,415 | 10/1938 | United Kingdom | 180/43 R |

OTHER PUBLICATIONS

Motor, Faults, Oct. 1954, p. 59.

Primary Examiner—Robert B. Reeves
Assistant Examiner—H. Grant Skaggs
Attorney, Agent, or Firm—Dorsey, Windhorst, Hannaford, Whitney & Halladay

[57] ABSTRACT

A vehicle has an axle assembly which comprises an axle, which axle includes a steering knuckle pivotally mounted to a rigid axle housing, and a spindle, for supporting a wheel of the vehicle for rotation, mounted to the steering knuckle. The steering knuckle and spindle have mounting pads which are held in facing relationship. In its apparatus aspects, the present invention involves a tapered shim member interposed between the mounting pads in order to adjust the angle formed by the spindle and axle to thereby adjust the camber of the wheel. In its method aspects, the invention involves changing the angle between the spindle and axle. The present invention finds an important application in adjusting the camber of the front wheels of conventionally constructed four-wheel drive vehicles.

3 Claims, 4 Drawing Figures

APPARATUS FOR ADJUSTING CAMBER

BACKGROUND OF THE INVENTION

1. Field of the Invention

This invention is related to land vehicles and, more particularly, an improved method and apparatus for adjusting the camber of the wheels of such vehicles.

2. Description of the Prior Art

The importance of being able to accurately adjust the camber of a wheel of a vehicle is well known. Without precise adjustment of camber, tire wear is increased significantly and operating costs rise because tires must be replaced more frequently than is the case with wheels whose camber is correctly adjusted. If a tire mounted on a wheel having incorrect camber adjustment is not replaced, then it will ultimately wear out and become a safety hazard.

Camber adjustment is particularly critical on the front wheels of a vehicle and the problem is compounded when the vehicle has four-wheel drive. Of course, it is well known to those skilled in the art that in any vehicle the camber adjustment of the front wheels is more critical than that of the rear wheels. This is true whether the vehicle has four-wheel drive or not. Since the front wheels are used for steering, maladjustments in camber cause more rapid tire wear than is caused by the same maladjustment if present in the rear wheels. It is also well known that poor steering characteristics are a result of camber maladjustments of a vehicle's front wheels.

In vehicles other than those having the conventional four-wheel drive arrangement, the front wheels are usually suspended from the vehicle independently of each other, and the camber of each wheel can be adjusted individually. However, conventionally constructed four-wheel drive vehicles have a rigid front axle with a wheel mounted at each end, and the camber of each wheel cannot be individually adjusted in a practical manner by any known prior art method or by using any known prior art apparatus.

There are at least two known prior art ways of dealing with incorrect camber in front-wheel drive vehicles. The first way is to simply accept the fact that the camber of the front wheels of such vehicles cannot be adjusted and to continually rotate the tires in order to gain maximum mileage from all tires. This is clearly not a solution since it merely causes the relatively unworn tire which is placed on the front axle to wear at a greater rate, rather than reducing the rate of wear itself.

A second approach is to attempt to bend the axle housing to change the angle the wheels make with each other. This approach, while changing the camber of the wheels, introduces large stresses on the parts of the axle which are bent. On occasion, axle housings will break under the stress of bending them, clearly an unacceptable result from the standpoint of the cost involved in replacing the broken axle housing. And even if the axle does not break, these stresses can weaken the axle, rendering it more prone to breakage under operating conditions, thus creating a potentially dangerous situation.

It is also extremely impractical for a manufacturer of such vehicles to attempt to control camber as the vehicle is being made, so that this is not a solution to the problem of incorrect camber either. Adjustments of approximately $\frac{1}{4}°$ or less are necessary in order to optimize camber, and it is apparent that manufacturing tolerances cannot be held close enough, consistent with minimizing the overall cost of the vehicle, in order to enable such a small angle to be controlled.

Thus, the prior art is lacking a practical and economical manner in which the camber of wheels mounted to a rigid axle can be adjusted, either at the point of manufacture of the vehicle or subsequently. This lack is particularly acute because this is the way that the front axle assembly of a four-wheel drive vehicle is conventionally constructed.

SUMMARY OF THE INVENTION

It is accordingly an object of the present invention to provide an improved means and method for adjusting camber.

It is also an object of the present invention to provide an improved means and method for adjusting the camber of the front wheels of a four-wheel drive vehicle.

The present invention in its apparatus aspects is an improvement in an axle assembly for a wheel of a vehicle. The assembly includes an axle having a first mounting pad, a spindle for supporting the vehicle wheel for rotation, which spindle has a second mounting pad, and means for securing the spindle to the axle with the mounting pads in facing relationship. The improvement comprises a shim means which is interposed between the first and second mounting pads in order to control the angle which the spindle forms with the axle and thereby control the camber of the wheel.

The present invention also includes a method for adjusting the camber of a wheel in an axle assembly of the type described above. The method comprises adjusting the angle formed between the spindle and the axle to thereby control the camber of the wheel.

BRIEF DESCRIPTION OF THE DRAWINGS

A more complete understanding of the present invention may be gained by consideration of the accompanying specification along with the drawings, in which like numerals refer to like parts throughout, wherein.

DETAILED DESCRIPTION OF THE INVENTION

Figure 1:
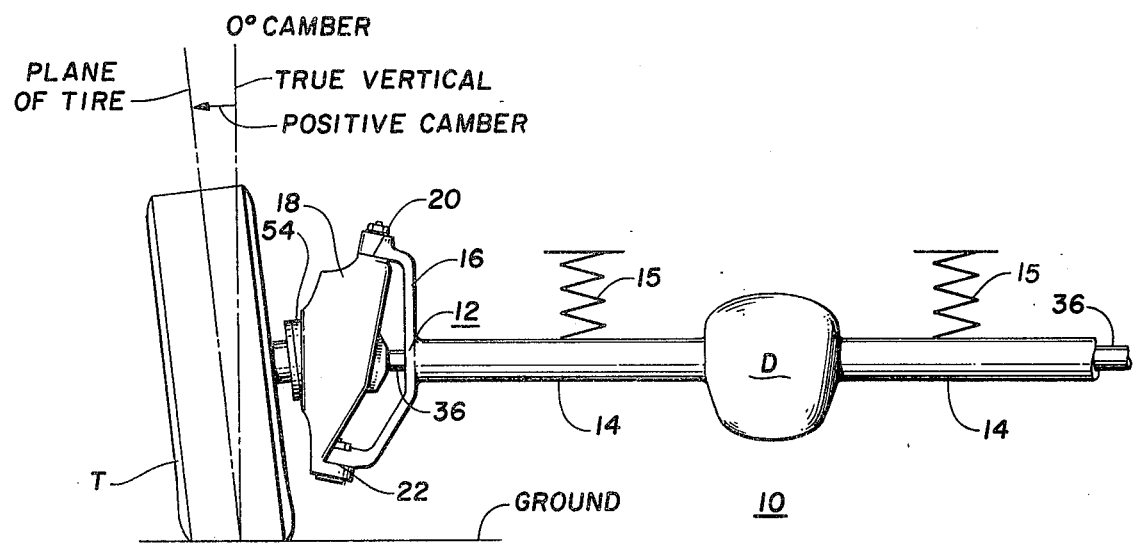
FIG. 1 shows a front axle assembly of a conventional four-wheel drive vehicle.
Figure 2:
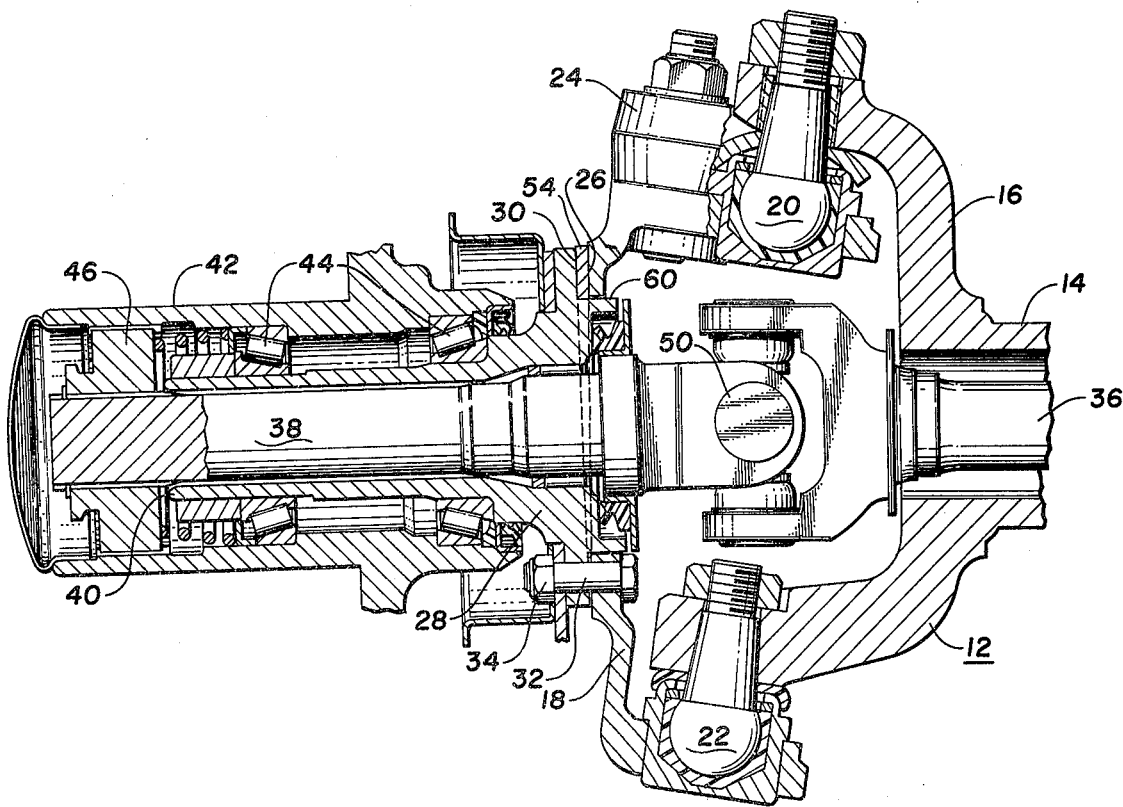
FIG. 2 is a detail view of one end of the axle assembly shown in FIG. 1.

Referring now to FIG. 1, a front axle assembly 10 for supporting the front wheels of a conventional four-wheel drive vehicle includes an axle 12, a spindle at each end of axle 12 (see FIG. 2), and means for transmitting power to the wheels (see FIG. 2). Axle 12 includes rigid axle housings 14 connected, as by welding, to the casing of differential D, and axle assembly 10 is mounted to the vehicle by securing axle housings 14 to the vehicle with conventional suspension members such as springs, struts and shock absorbers 15 (shown schematically). Each axle housing 14 terminates in a yoke 16. Axle 12 also includes a steering knuckle 18 which is pivotally connected to yoke 16 at upper ball joint 20 and lower ball joint 22. Suitable means are provided for pivoting steering knuckle 18 about ball joints 20 and 22 (see FIG. 2) to provide for steering of the vehicle in a conventional manner. The wheels (not shown) are supported by the spindles for rotation. Tires T (only one of which is shown) are mounted to the wheels in a conventional manner.

Camber is illustrated in FIG. 1. The line "Plane of Tire" is an edge view of a plane drawn through the center of the tire in the plane of the tire. The line "True Vertical" is an edge view of a plane drawn through the line where the "Plane of Tire" line intersects the ground. "True Vertical" is perpendicular to the ground and defines 0° camber. The tire in FIG. 1 is represented as having positive camber, that is, with the top of the tire displaced outwardly from 0° camber. Therefore, camber is the measurement of the angular displacement of the plane of the wheel, and tire, from true vertical and is expressed in terms of degrees, either positive or negative. It will be readily apparent to those skilled in the art that FIG. 1 is drawn with camber greatly exaggerated for purposes of illustration. In most applications, maladjustment of camber of less than 1° is enough to cause excessive tire wear, and normal camber adjustment is, in most instances, less than 1° positive.

The problems of the prior art are readily apparent from an examination of FIG. 1. If the camber of the wheel is too far from its optimum setting, it can easily be seen from FIG. 1 that one edge of the tire will wear more quickly than the other. The previous manner in which camber was adjusted was by bending axle housing 14. However, as we pointed out above, this manner of adjusting camber is very unsatisfactory since breakage can occur.

Referring now to FIG. 2, in which the wheel and tire T are omitted for clarity, a detail of one end of axle assembly 10 shown in FIG. 1 as shown. It is understood that the opposite end of axle assembly 10 is similar to the end shown in FIG. 2. Upper ball joint 20 and lower ball joint 22 are secured to yoke 16 by suitable means, and ball joints 20 and 22 pivotally mount steering knuckle 18 to yoke 16. A boss 24 connects a steering arm by suitable linkages and other members to the vehicle steering wheel and to a similarly mounted steering knuckle at the other end of axle assembly 10. This linkage coordinates the pivoting of the two steering knuckles. The steering linkage and its connection with the vehicle steering wheel are all conventional and known to those familiar with steering geometry and is not shown or described here in detail. Steering knuckle 18 has a first mounting pad 26, the face of which first mounting pad 26 is generally circular.

Axle assembly 10 also includes a spindle 28 provided for supporting the wheel for rotation. Spindle 28 has a second mounting pad 30, the face of which second mounting pad 30 is generally circular and is perpendicular to the axis of spindle 28. Means are provided for securing spindle 28 to axle 12 with first mounting pad 26 on steering knuckle 18 and second mounting pad 30 on spindle 28 in face-to-face relationship. In a conventional construction, this means is a plurality of bolts 32 and nuts 34.

Axle assembly 10 further includes flexible means for transmitting power to the wheel comprising axle rods 36 which extend interiorly of rigid axle housings 14 (see FIG. 1) and each axle rod 36 has an interior end (not shown) for connection to differential D in order to transmit driving power to axle rod 36. The flexible means for transmitting power to the wheel further comprises a stub shaft 38 which extends interiorly of spindle 28 and extends beyond the outer end 40 thereof; a hub 42 which is mounted for rotation on spindle 28 by suitable bearings 44; a drive gear 46 which is splined to stub shaft 38 and hub 42 in order to transmit driving power from stub shaft 38 to hub 42; and a universal joint 50 which comprises means for transmitting driving power to stub shaft 38 from axle rod 36 during pivoting of steering knuckle 18 about ball joints 20, 22 in order to steer the wheel. The wheel is suitably secured to hub 42.

The axle assembly described thus far is conventional in the front axle of four-wheel drive vehicles. While there may be variations from the configurations described, such as the provision of means for selectively disengaging hub 42 from driving relationship with stub shaft 38, the common feature in all such axle assemblies is the provision of a mounting pad on the steering knuckle of the axle, which mounting pad is held in facing relationship with a mounting pad on the spindle supporting the wheel for rotation.

Figure 3:
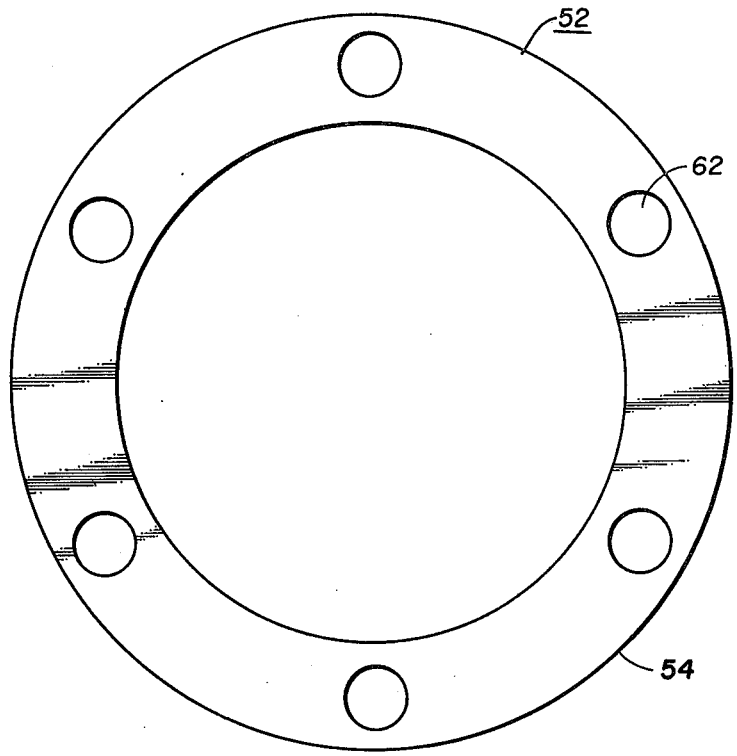
FIG. 3 is a plan view of the shim used in the present invention.
Figure 4:
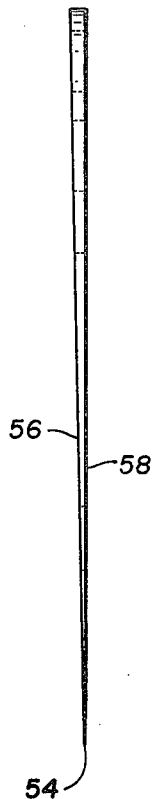
FIG. 4 is a side view of the shim shown in FIG. 3.

The present invention in its apparatus aspects represents an improvement over the axle assembly just described. Referring to FIGS. 2, 3 and 4, a shim means 52 is interposed between first mounting pad 26 and second mounting pad 30. The structure of shim means 52 is best seen in FIGS. 3 and 4. In its preferred embodiment, shim means 52 comprises a circular, tapered shim member 54 having opposing planar faces 56 and 58. Shim member 54 has an outside diameter substantially equal to the outside diameter of mounting pad 30. The inside diameter is sized to permit shim member 54 to fit over flange 60 on spindle 28. Holes 62 are provided in shim member 54 in order to permit bolts 32 to pass therethrough.

The improved axle assembly of the present invention enables the camber of the wheel to be precisely adjusted due to the interposition of shim member 54 between mounting pads 26 and 30. The amount of taper in shim member 54 will control the camber of the wheel and tire T, and by using a shim with the proper dimensions, camber can be adjusted to very close tolerances.

In its method aspects, the present invention involves changing the angle between the axle and spindle. This method, which can be practiced by interposing a shim means between the mounting pads, will be particularly useful to vehicle manufacturers, but will also find wide application with users of such vehicles.

It will be apparent to those skilled in the art that the present invention is not limited to use for adjustment of the camber of the front wheels of four-wheel drive vehicles. It can be used to adjust the camber of any wheel which is mounted on a spindle having a mounting pad secured in facing relationship with a mounting pad on an axle. The present invention significantly increases the mileage obtained on the front tires of conventional four-wheel drive vehicles, and fulfills a long-felt need of owners and manufacturers of such vehicles to be able to quickly and easily adjust the camber of the front wheels. However, the description of the present invention in connection with a four-wheel drive vehicle in the present application is for purposes only of illustration, and use of the described and claimed means and method for adjusting camber of the wheels, front or rear, of any vehicle falls within the scope of the present invention.

It will also be apparent to those skilled in the art that the shim means can take forms other than that of the tapered shim member 54 without departing from the spirit of the invention. Any device which changes the angle between the spindle and axle is within the meaning of the term "shim means" and is therefore within the scope of the invention.

Although only specific embodiments of the present invention have been shown and described, those skilled in the art will perceive further modifications, other than those specifically pointed out above, which can be made without departing from the spirit of the invention, and it is intended by the appended claims to cover all such modifications as fall within the true spirit and scope of the invention.

I claim:

1. In an axle assembly for supporting a driven, steerable wheel of a vehicle, the axle assembly comprising:

a rigid, hollow axle housing;

a yoke rigidly secured to one end of the said axle housing;

a steering knuckle pivotally mounted to said yoke to provide for steering of the wheel when said steering knuckle is pivoted, wherein said steering knuckle includes a first mounting pad;

a spindle for supporting the wheel for rotation, wherein said spindle includes a second mounting pad;

means for securing said spindle to said steering knuckle with said first and second mounting pads in facing relationship; and means for transmitting power to said spindle including:

a. an axle rod extending interiorly of said axle housing, said axle rod having an interior end for attachment to a source of driving power to rotate said axle rod and an exterior end proximate to said one end of said axle housing, b. a stub shaft encircled by said first and second mounting pads for cooperating with said spindle to provide powered rotation of the wheel, and c. means cooperating with said exterior end of said axle rod and with said stub shaft for transmitting driving power to said stub shaft from said axle rod during pivoting of said steering knuckle;

the improvement comprising:

shim means interposed between said first and second mounting pads for controlling the camber of the wheel.

2. The improvement recited in claim 1 wherein:

said first mounting pad is substantially planar;

said second mounting pad is substantially planar and is oriented generally perpendicular to the axis of said spindle; and said shim means comprises a tapered shim member having substantially planar faces.

3. The improvement recited in claim 2 wherein:

said first mounting pad is generally circular in configuration;

said second mounting pad is generally circular in configuration and has a diameter substantially equal to the diameter of said first mounting pad;

said means for securing said spindle to said steering knuckle comprises a plurality of bolt members having predetermined circumferential locations extending through said mounting pads and having cooperating nuts threaded onto said bolt member; and said shim member is generally circular in configuration and has a diameter substantially equal to the diameter of said first and second mounting pads, said shim member including a plurality of precisely located holes through which holes said bolt members pass to precisely determine the circumferential orientation of said shim member.

* * * * *